US010017045B1

(12) United States Patent
Swales et al.

(10) Patent No.: US 10,017,045 B1
(45) Date of Patent: Jul. 10, 2018

(54) TRANSMISSION FOR A HYBRID POWERTRAIN

(71) Applicant: GM GLOBAL TECHNOLOGY OPERATIONS LLC, Detroit, MI (US)

(72) Inventors: Shawn H. Swales, Canton, MI (US); Craig S. Ross, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/398,745

(22) Filed: Jan. 5, 2017

(51) Int. Cl.
| | |
|---|---|
| *B60K 6/54* | (2007.10) |
| *B60K 6/365* | (2007.10) |
| *F16H 3/091* | (2006.01) |
| *F16H 3/72* | (2006.01) |
| *B60K 6/445* | (2007.10) |
| *F16H 37/08* | (2006.01) |

(52) U.S. Cl.
CPC ............... *B60K 6/54* (2013.01); *B60K 6/365* (2013.01); *B60K 6/445* (2013.01); *F16H 3/091* (2013.01); *F16H 3/728* (2013.01); *F16H 37/0826* (2013.01); *F16H 37/0833* (2013.01); *B60Y 2200/92* (2013.01); *B60Y 2400/73* (2013.01); *Y10S 903/91* (2013.01); *Y10S 903/917* (2013.01)

(58) Field of Classification Search
CPC .......... B60K 6/54; B60K 6/445; B60K 6/365; F16H 37/0833; F16H 3/091; F16H 3/728; F16H 34/0826; B60Y 2200/92; B60Y 2400/73
See application file for complete search history.

(56) References Cited

U.S. PATENT DOCUMENTS

| | | | | |
|---|---|---|---|---|
| 7,609,011 | B2 * | 10/2009 | Yatabe ................. | B60W 20/30 180/65.285 |
| 8,142,317 | B2 * | 3/2012 | Nagamatsu ............ | B60K 6/365 475/5 |
| 2003/0224892 | A1 * | 12/2003 | Yamauchi ................ | B60K 6/26 475/5 |
| 2004/0198551 | A1 * | 10/2004 | Joe ........................ | B60K 6/365 477/3 |
| 2005/0202929 | A1 * | 9/2005 | Tsuneyoshi ............ | B60K 6/445 477/5 |
| 2009/0314560 | A1 * | 12/2009 | Oba ....................... | B60K 6/365 180/65.22 |
| 2017/0059033 | A1 * | 3/2017 | Shioiri ................. | F16H 57/045 |
| 2017/0066317 | A1 * | 3/2017 | Kurosaki ............ | F16H 57/0424 |

* cited by examiner

*Primary Examiner* — David J Hlavka
(74) *Attorney, Agent, or Firm* — Quinn IP Law

(57) ABSTRACT

A transmission for a hybrid powertrain includes a first input, a second input, a third input, and an output. A sun gear is attached to and rotatable with the first input. A carrier is attached to and rotatable with the third input. The carrier rotatably supports a plurality of pinions. Each of the pinions includes a first pinion gear and a second pinion gear. Each second pinion gear of the pinions is disposed in meshing engagement with the sun gear. A first ring gear is disposed in meshing engagement with each first pinion gear of the pinions. The first ring gear is disposed in torque communication with the second input. A second ring gear is disposed in meshing engagement with each second pinion gear of the pinions. The second ring gear is disposed in torque communication with the output.

18 Claims, 2 Drawing Sheets

TRANSMISSION FOR A HYBRID POWERTRAIN

INTRODUCTION

The disclosure generally relates to a transmission for a hybrid powertrain.

A hybrid powertrain may include a first electric device, a second electric device, and a prime mover. The prime mover may include, but is not limited to, an internal combustion engine. A transmission selectively receives torque from each of the first electric device, the second electric device, and the prime mover, and transfers the torque to a final drive.

SUMMARY

A transmission is provided. The transmission includes a first input, a second input, a third input, and an output. A sun gear is attached to and rotatable with the first input. A carrier is attached to and rotatable with the third input. The carrier rotatably supports a plurality of pinions. Each of the plurality of pinions includes a first pinion gear and a second pinion gear attached together for common rotation. Each second pinion gear of each of the plurality of pinions is disposed in meshing engagement with the sun gear. A first ring gear is disposed in meshing engagement with each first pinion gear of each of the plurality of pinions. The first ring gear is disposed in torque communication with the second input. A second ring gear is disposed in meshing engagement with each second pinion gear of each of the plurality of pinions. The second ring gear is disposed in torque communication with the output.

In one aspect of the transmission, a first transfer gear is disposed in meshing engagement with the first ring gear and the second input.

In another aspect of the transmission, a transfer gear set interconnects the second ring gear and the output. The transfer gear set includes a layshaft, which supports a second transfer gear and a third transfer gear. The second transfer gear and the third transfer gear are attached to and rotatable with the layshaft. The third transfer gear is disposed in meshing engagement with the second ring gear.

In another aspect of the transmission, the transfer gear set includes a final drive gear that is coupled to the output. The second transfer gear is disposed in meshing engagement with the final drive gear.

In another aspect of the transmission, an input brake is coupled to the third input, and operable to resist rotation of the third input. In one embodiment, the first input defines a hollow interior, and the input brake includes a brake shaft attached to the third input, and disposed radially within the hollow interior of the first input.

In another aspect of the transmission, the first input is attached to a first electric device, and is operable to receive torque from the first electric device. The second input is attached to a second electric device, and is operable to receive torque from the second electric device. The third input is attached to a prime mover, and is operable to receive torque from the prime mover. The output is attached to a final drive, and is operable to transmit torque to the final drive.

A powertrain is also provided. The powertrain includes a first electric device, a second electric device, a prime mover, and a transmission. The transmission is coupled to the first electric device, the second electric device, the prime mover. The transmission is operable to transmit torque from the first electric device, the second electric device, and the prime mover to a final drive. The transmission includes a first input that is attached to the first electric device. The first input is operable to receive torque from the first electric device. A second input is attached to the second electric device. The second input is operable to receive torque from the second electric device. A third input is attached to the prime mover. The third input is operable to receive torque from the prime mover. An output is attached to the final drive. The output is operable to transmit torque to the final drive. A sun gear is attached to and rotatable with the first input. A carrier is attached to and rotatable with the third input. The carrier rotatably supports a plurality of pinions. Each of the plurality of pinions includes a first pinion gear and a second pinion gear. Each second pinion gear of each of the plurality of pinions is disposed in meshing engagement with the sun gear. A first ring gear is disposed in meshing engagement with each first pinion gear of each of the plurality of pinions. The first ring gear is disposed in torque communication with the second input. A second ring gear is disposed in meshing engagement with each second pinion gear of each of the plurality of pinions. The second ring gear is disposed in torque communication with the output.

In one aspect of the powertrain, a first transfer gear is disposed in meshing engagement with the first ring gear and the second input.

In another aspect of the powertrain, a transfer gear set interconnects the second ring gear and the output. The transfer gear set includes a layshaft that supports a second transfer gear and a third transfer gear. The second transfer gear and the third transfer gear are attached to and rotatable with the layshaft. The third transfer gear is disposed in meshing engagement with the second ring gear.

In another aspect of the powertrain, the transfer gear set includes a final drive gear coupled to the output. The second transfer gear is disposed in meshing engagement with the final drive gear.

In another aspect of the powertrain, an input brake is coupled to the third input. The input brake is operable to resist rotation of the third input.

The above features and advantages and other features and advantages of the present teachings are readily apparent from the following detailed description of the best modes for carrying out the teachings when taken in connection with the accompanying drawings.

DETAILED DESCRIPTION

Figure 1:
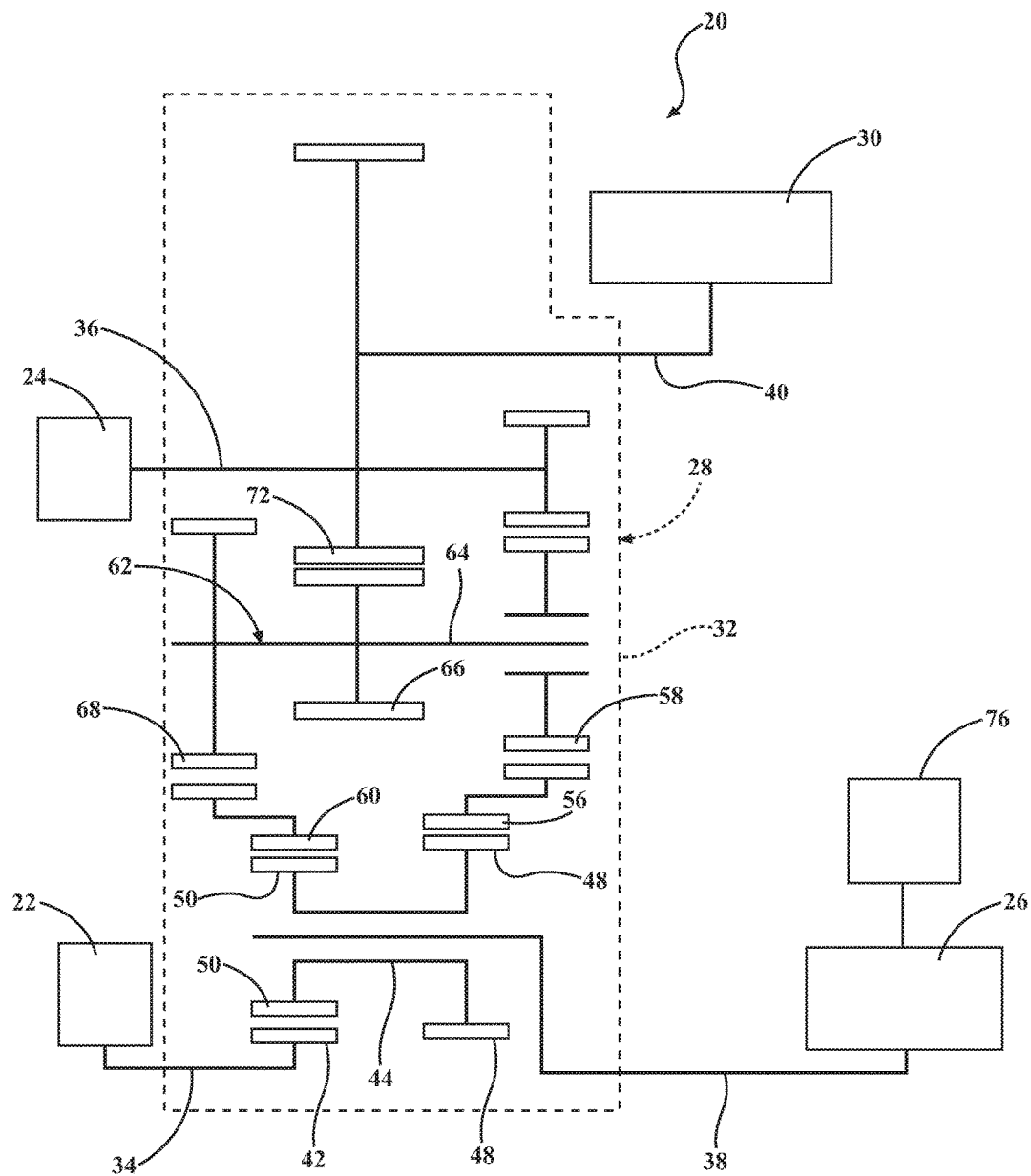
FIG. 1 is a schematic stick diagram of a powertrain.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the FIGS., wherein like numerals indicate like parts throughout the several views, a powertrain is generally shown at 20. The powertrain 20 may be incorporated into any moveable platform, such as but not limited to a car, a truck, a boat, an ATV, a motorcycle, a tractor, etc.

The powertrain 20 includes a first electric device 22, a second electric device 24, a prime mover 26, a transmission 28, and a final drive 30. The first electric device 22 and the second electric device 24 may include any device that is capable of converting electrical energy into torque and/or rotation of a shaft. For example, the first electric device 22 and the second electric device 24 may each include, but are not limited to, an electric motor or an electric motor/generator. It should be appreciated that the first electric device 22 and the second electric device 24 may include some other device not specifically mentioned or described herein. The specific type and configuration of the first electric device 22 and the second electric device 24 are not pertinent to the teachings of this disclosure, and are therefore not described in detail herein.

The prime mover 26 may include any device or system that is operable to generate a torque and/or rotate a shaft. The prime mover 26 may include, but is not limited to an internal combustion engine, such as a gasoline engine or a diesel engine. It should be appreciated that the prime mover 26 may include some other device not specifically mentioned or described herein. The specific type and configuration of the prime mover 26 are not pertinent to the teachings of this disclosure, and are therefore not described in detail herein.

The transmission 28 is coupled to the first electric device 22, the second electric device 24, the prime mover 26, and is operable to transmit torque from the first electric device 22, the second electric device 24, and the prime mover 26 to the final drive 30. The final drive 30 transmits torque between the transmission 28 and a drive device. The drive device may include, but is not limited to, a wheel, a track, a propeller, etc. The final drive 30 may include, but is not limited to, an axle shaft, a differential gear set, a prop shaft, one or more wheels, etc. The specific configuration and components of the final drive 30 are not pertinent to the teachings of this disclosure, and are therefore not described in detail herein.

The transmission 28 includes a housing 32, which supports the components of the transmission 28. The housing 32 may additionally support the first electric device 22 and/or the second electric device 24. The transmission 28 further includes a first input 34, a second input 36, a third input 38, and an output 40. The first input 34 is attached to the first electric device 22, and is operable to receive torque from the first electric device 22. The first input 34 may include, but is not limited to, a shaft, or other similar structure that is capable of transmitting torque and/or rotation between the first electric device 22 and the transmission 28. The first input 34 is rotatably supported by the housing 32. As such, one or more bearings may interconnect the first input 34 and the housing 32.

The second input 36 is attached to the second electric device 24, and is operable to receive torque from the second electric device 24. The second input 36 may include, but is not limited to, a shaft, or other similar structure that is capable of transmitting torque and/or rotation between the second electric device 24 and the transmission 28. The second input 36 is rotatably supported by the housing 32. As such, one or more bearings may interconnect the second input 36 and the housing 32.

The third input 38 is attached to the prime mover 26, and is operable to receive torque from the prime mover 26. The third input 38 may include, but is not limited to, a shaft, or other similar structure capable of transmitting torque and/or rotation between the prime mover 26 and the transmission 28. The third input 38 is rotatably supported by the housing 32. As such, one or more bearings may interconnect the third input 38 and the housing 32.

The output 40 is attached to the final drive 30, and is operable to transmit torque to the final drive 30. The output 40 may include, but is not limited to, a shaft or other similar structure that is capable of transmitting torque and/or rotation between the transmission 28 and the final drive 30. The output 40 is rotatably supported by the housing 32. As such, one or more bearings may interconnect the output 40 and the housing 32.

A sun gear 42 is attached to and rotatable with the first input 34. Accordingly, it should be appreciated that the first electric device 22 applies torque to the first input 34, which in turn applies torque to the sun gear 42. Similarly, it should also be appreciated that torque applied to the sun gear 42, is transmitted to the first electric device 22 through the first input 34.

Figure 2:
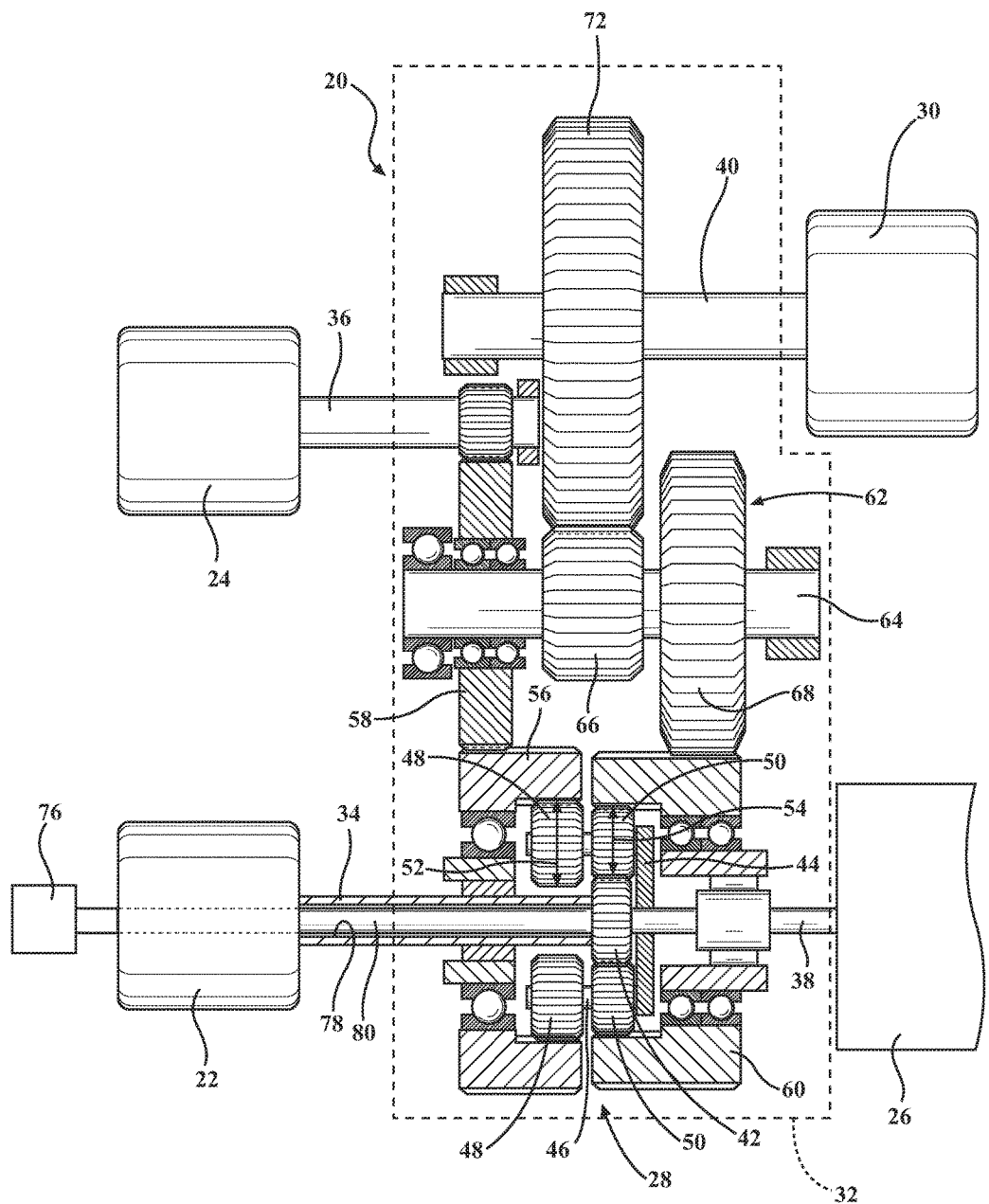
FIG. 2 is a schematic cross sectional view of the powertrain.

A carrier 44 is attached to and rotatable with the third input 38. Accordingly, it should be appreciated that the prime mover 26 applies torque to the third input 38, which in turn applies torque to the carrier 44. Similarly, it should be appreciated that torque applied to the carrier 44, is transmitted to the prime mover 26 through the third input 38. As shown in FIG. 2, the carrier 44 may rotatably support a plurality of pinion assemblies 46. Each of the pinion assemblies 46 includes a respective first pinion gear 48 and a respective second pinion gear 50 attached together for common rotation about a pinion axis. Accordingly, each pinion assembly 46 includes one first pinion gear 48 and one second pinion gear 50. Each adjacent pair of pinion gears, including one first pinion gear 48 and one second pinion gear 50, rotate in unison with their respective pinion assembly 46. Each adjacent pair of pinion gears, including one first pinion gear 48 and one second pinion gear 50, may be integrally formed as a single component, or may formed as individual pieces and connected together in a manner that allows the first pinion gear 48 and the second pinion gear 50 to rotate in unison. As shown in FIG. 2, the first pinion gears 48 include a first diameter 52, and the second pinion gears 50 include a second diameter 54. The first diameter 52 of the first pinion gears 48 is larger than the second diameter 54 of the second pinion gears 50, thereby forming a stepped pinion gear arrangement. Each respective second pinion gear 50 of each of the pinion assemblies 46 is disposed in meshing engagement with the sun gear 42, for communicating torque and rotation between the pinion assemblies 46 and the sun gear 42.

A first ring gear 56 is disposed in meshing engagement with each respective first pinion gear 48 of each of the pinion assemblies 46. The first ring gear 56 is further disposed in torque communication with the second input 36. More specifically, a first transfer gear 58 is disposed in meshing engagement with the first ring gear and the second input 36, for communicating torque and rotation between the second input 36 and the first ring gear 56. Accordingly, it should be appreciated that the second electric device 24 applies torque to the second input 36, which in turn applies torque to the first transfer gear 58, which in turn applies the torque to the first ring gear 56. Similarly, it should also be appreciated that torque applied to the carrier 44, may be transmitted to the second electric device 24 through the first pinion gears 48, the first transfer gear 58, and the second input 36.

A second ring gear 60 is disposed in meshing engagement with each respective second pinion gear 50 of each of the pinion assemblies 46. The second ring gear 60 is disposed in torque communication with the output 40. More specifically, the transmission 28 includes a transfer gear set 62 interconnecting the second ring gear 60 and the output 40. The transfer gear set 62 includes a layshaft 64 supporting a second transfer gear 66 and a third transfer gear 68. The second transfer gear 66 and the third transfer gear 68 are attached to and rotatable with the layshaft 64. The layshaft 64 rotatably supports the first transfer gear 58. As such, one or more bearings may interconnect the first transfer gear 58 and the layshaft 64. The housing 32 rotatably supports the layshaft 64. As such, one or more bearings may interconnect the layshaft 64 and the housing 32. The third transfer gear 68 is disposed in meshing engagement with the second ring gear 60. The transfer gear set 62 further includes a final drive gear 72 that interconnects the output 40 and the second transfer gear 66. As shown in FIG. 2, the final drive gear 72 is coupled to the output 40. The second transfer gear 66 is disposed in meshing engagement with the final drive gear 72. It should be appreciated that because both the second transfer gear 66 and the third transfer gear 68 are rotatable with the layshaft 64, rotation of the third transfer gear 68 also rotates the second transfer gear 66. Rotation and/or torque applied to the final drive gear 72 is transferred to the output 40.

Referring to FIG. 2, the transmission 28 may further include an input brake 76. In the exemplary embodiment shown, the input brake 76 is coupled to the third input 38. The input brake 76 is operable to resist rotation of the third input 38. For example, the input brake 76 may selectively connect the third input 38 to the housing 32 to resist or prevent rotation of the third input 38. In the exemplary embodiment shown, the first input 34 defines a hollow interior 78. The input brake 76 includes a brake shaft 80 that is attached to the third input 38 through the hollow interior 78 of the first input 34. The brake shaft 80 is disposed radially within the hollow interior 78 of the first input 34. As such, the brake shaft 80 and the first input 34 are coaxially aligned and rotatable about a common axis of rotation. The input brake 76 may include, but is not limited to, a brake or clutch interconnecting the brake shaft 80 and the housing 32. Additionally, the brake shaft 80 may be rotatably supported by the housing 32. As such, one or more bearings may interconnect the brake shaft 80 and the housing 32. The specific configuration and operation of the input brake 76 is not pertinent to the teachings of this disclosure, and are therefore not described in detail herein.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A transmission comprising:
   a first input;
   a second input;
   a third input;
   an output;
   a sun gear attached to and rotatable with the first input;
   a carrier attached to and rotatable with the third input, the carrier rotatably supporting a plurality of pinion assemblies, with each of the plurality of pinion assemblies including a respective first pinion gear and a respective second pinion gear operatively connected for common rotation;
   wherein each second pinion gear of each of the plurality of pinion assemblies is disposed in meshing engagement with the sun gear;
   a first ring gear disposed in meshing engagement with each respective first pinion gear of each of the plurality of pinion assemblies, and disposed in torque communication with the second input;
   a second ring gear disposed in meshing engagement with each respective second pinion gear of each of the plurality of pinion assemblies, and disposed in torque communication with the output; and
   a first transfer gear disposed in meshing engagement with the first ring gear and the second input.

2. The transmission set forth in claim 1, further comprising a transfer gear set interconnecting the second ring gear and the output.

3. The transmission set forth in claim 2, wherein the transfer gear set includes a layshaft supporting a second transfer gear and a third transfer gear.

4. The transmission set forth in claim 3, wherein the second transfer gear and the third transfer gear are attached to and rotatable with the layshaft.

5. The transmission set forth in claim 4, wherein the third transfer gear is disposed in meshing engagement with the second ring gear.

6. The transmission set forth in claim 5, wherein the transfer gear set includes a final drive gear coupled to and rotatable with the output.

7. The transmission set forth in claim 6, wherein the second transfer gear is disposed in meshing engagement with the final drive gear.

8. The transmission set forth in claim 1, further comprising an input brake coupled to the third input, and operable to resist rotation of the third input.

9. The transmission set forth in claim 8, wherein the first input defines a hollow interior, and wherein the input brake includes a brake shaft attached to the third input, and disposed radially within the hollow interior of the first input.

10. The transmission set forth in claim 1, wherein:
   the first input is attached to a first electric device, and operable to receive torque from the first electric device;
   the second input is attached to a second electric device, and operable to receive torque from the second electric device;
   the third input is attached to a prime mover, and operable to receive torque from the prime mover; and
   the output is attached to a final drive, and operable to transmit torque to the final drive.

11. A powertrain comprising:
   a first electric device;
   a second electric device;
   a prime mover; and
   a transmission coupled to the first electric device, the second electric device, and the prime mover, and operable to transmit torque from the first electric device, the second electric device, and the prime mover to a final drive, the transmission including:
      a first input attached to the first electric device and operable to receive torque from the first electric device;
      a second input attached to the second electric device and operable to receive torque from the second electric device;
      a third input attached to the prime mover and operable to receive torque from the prime mover;
      an output attached to the final drive, and operable to transmit torque to the final drive;

a sun gear attached to and rotatable with the first input;

a carrier attached to and rotatable with the third input, the carrier rotatably supporting a plurality of pinion assemblies, with each of the plurality of pinion assemblies including a respective first pinion gear and a respective second pinion gear operatively connected for common rotation;

wherein each respective second pinion gear of each of the plurality of pinion assemblies is disposed in meshing engagement with the sun gear;

a first ring gear disposed in meshing engagement with each respective first pinion gear of each of the plurality of pinion assemblies, and disposed in torque communication with the second input;

a second ring gear disposed in meshing engagement with each respective second pinion gear of each of the plurality of pinion assemblies, and disposed in torque communication with the output; and a first transfer gear disposed in meshing engagement with the first ring gear and the second input.

12. The powertrain set forth in claim 11, further comprising a transfer gear set interconnecting the second ring gear and the output.

13. The powertrain set forth in claim 12, wherein the transfer gear set includes a layshaft supporting a second transfer gear and a third transfer gear.

14. The powertrain set forth in claim 13, wherein the second transfer gear and the third transfer gear are attached to and rotatable with the layshaft.

15. The powertrain set forth in claim 14, wherein the third transfer gear is disposed in meshing engagement with the second ring gear.

16. The powertrain set forth in claim 14, wherein the transfer gear set includes a final drive gear coupled to the output.

17. The powertrain set forth in claim 16, wherein the second transfer gear is disposed in meshing engagement with the final drive gear.

18. The powertrain set forth in claim 11, further comprising an input brake coupled to the third input, and operable to resist rotation of the third input.

* * * * *